US012361466B2

(12) United States Patent
Douglas et al.

(10) Patent No.: US 12,361,466 B2
(45) Date of Patent: *Jul. 15, 2025

(54) SYSTEMS FOR GENERATING A PHOTONICS DATABASE

(71) Applicant: MeetOptics Labs S.L., Barcelona (ES)

(72) Inventors: James Stewart Douglas, Barcelona (ES); Bárbara Buades Sabater, Barcelona (ES)

(73) Assignee: Meetoptics Labs S.L., Barcelona (ES)

( * ) Notice: Subject to any disclaimer, the term of this patent is extended or adjusted under 35 U.S.C. 154(b) by 130 days.

This patent is subject to a terminal disclaimer.

(21) Appl. No.: 17/889,167

(22) Filed: Aug. 16, 2022

(65) Prior Publication Data

US 2023/0075561 A1 Mar. 9, 2023

Related U.S. Application Data

(60) Provisional application No. 63/233,702, filed on Aug. 16, 2021, provisional application No. 63/233,705, (Continued)

(51) Int. Cl.
G06Q 30/00 (2023.01)
G06F 16/248 (2019.01)
G06Q 30/0601 (2023.01)

(52) U.S. Cl.
CPC ....... *G06Q 30/0627* (2013.01); *G06F 16/248* (2019.01); *G06Q 30/0629* (2013.01); *G06Q 30/0643* (2013.01)

(58) Field of Classification Search
CPC .......................... G06Q 30/0627; G06F 16/248
(Continued)

(56) References Cited

U.S. PATENT DOCUMENTS 9,058,623 B2 6/2015 Gindi et al.
9,176,995 B2 11/2015 Li et al.
(Continued)

FOREIGN PATENT DOCUMENTS

WO 2012048057 A2 4/2012
WO 2014117267 A1 8/2014

OTHER PUBLICATIONS

Zhang, Z. (2007). Large scale information integration on the web: Finding, understanding and querying web databases (Order No. 3270067). Available from ProQuest Dissertations & Theses Global. (304859110). (Year: 2007).*

(Continued)

*Primary Examiner* — Arielle E Weiner
(74) *Attorney, Agent, or Firm* — Procopio, Cory, Hargreaves & Savitch LLP

(57) ABSTRACT

A system comprising: at least one hardware processor; and one or more software modules that are configured to, when executed by the at least one hardware processor, access product information for a plurality of products from a plurality of external systems; extract product data from the accessed product information; process text and table information to extract further product data from the accessed product information; standardized the extracted product data; store the standardized product data; store the standardized product data in a database; and present a user interface to user systems that presents standardized information related to the plurality of products that enables searching, filtering and comparing of the standardized information.

15 Claims, 7 Drawing Sheets

Related U.S. Application Data filed on Aug. 16, 2021, provisional application No. 63/233,719, filed on Aug. 16, 2021.

(58) Field of Classification Search
USPC ..................................................... 705/26.63
See application file for complete search history.

(56) References Cited

U.S. PATENT DOCUMENTS

| | | | |
|---|---|---|---|
| 9,595,053 | B1 | 3/2017 | Cunico et al. |
| 10,209,956 | B2 | 2/2019 | Fletcher et al. |
| 11,301,540 | B1* | 4/2022 | Boteanu ............... G06F 40/279 |
| 11,436,239 | B1* | 9/2022 | Price ..................... G06F 16/282 |
| 2010/0306080 | A1* | 12/2010 | Trandal .................. G06Q 10/10 705/26.8 |
| 2012/0005044 | A1* | 1/2012 | Coleman ............ G06Q 30/0643 705/27.2 |
| 2016/0078374 | A1 | 3/2016 | Lippow et al. |
| 2019/0057430 | A1* | 2/2019 | Zhu ..................... G06F 18/2163 |
| 2020/0380582 | A1* | 12/2020 | Nuta ....................... H04L 63/08 |
| 2021/0158420 | A1* | 5/2021 | Canfield ............... G06F 16/953 |
| 2021/0174150 | A1* | 6/2021 | Ripley ................... G06F 9/542 |
| 2021/0342919 | A1 | 11/2021 | Conquet et al. |

OTHER PUBLICATIONS

Ref U Continued: Retrieved from https://www.proquest.com/dissertations-theses/large-scale-information-integration-on-web/docview/304859110/se-2 (Year: 2007).*

Zhang, Z. (2007). Large scale information integration on the web: Finding, understanding and querying web databases (Order No. 3270067). Available from ProQuest Dissertations & Theses Global. (304859110). (Year: 2007); Retrieved from https://www.proquest.com/dissertations-theses/large-scale-information-integration-on-web/docview/304859110/se-2 (Year: 2007).

Notice of Allowance dated Dec. 28, 2023 in related U.S. Appl. No. 18/268,188, in 21 pages.

International Search Report and Written Opinion received in corresponding International Application No. PCT/US2022/040494, mailed on Nov. 4, 2022, 11 pages.

\* cited by examiner

FIG. 4

| | ← Back | Edmund ✕ Square Mirror ● ○ ● 5.00 € | Edmund ✕ Round Mirror ● ○ ● 10.00 € | THORLABS ✕ Round Mirror ● ○ ● 10.42 € |
|---|---|---|---|---|
| Supplier Code | | #31-001 | #27-400 | ME05-G01 |
| Availability | | Contact supplier | 2 - 3 days | In stock |
| Dimensions | | 3.0 x 3.0 mm | ø 5.0 mm | ø 12.7 mm |
| HR Coating | | Protected Aluminum | Protected Aluminum | Protected Aluminum |
| Reflectance | | $R_{avg} \geq 85\%$ (400 - 700nm) | $R_{avg} \geq 85\%$ (400 - 700nm) | $R_{avg} \geq 90\%$ (450 - 2000nm) $R_{avg} \geq 95\%$ (2000 - 20000nm) |
| Angle of Incidence | | 45° | 45° | - |
| Substrate | | Float Glass | Float Glass | Float Glass |
| Thickness | | 1 mm | 1 mm | 3.2 mm |
| Clear Aperture | | - | - | ≥ ø 11.43 mm |

FIG. 7

SYSTEMS FOR GENERATING A PHOTONICS DATABASE

RELATED APPLICATIONS INFORMATION

The present application claims the benefit of priority under 35 U.S.C. 119(e) to Provisional Patent Application Ser. No. 63/233,702, entitled "SYSTEMS AND METHODS FOR GENERATING A PHOTONICS DATABASE", filed Aug. 16, 2021, to Provisional Patent Application Ser. No. 63/233,705, entitled "SYSTEMS AND METHODS FOR GENERATING A USER INTERFACE FOR A PHOTONICS DATABASE", filed Aug. 16, 2021, to Provisional Patent Application Ser. No. 63/233,719, entitled "SYSTEMS AND METHODS FOR GENERATING PRODUCT QUOTATIONS USING A USER INTERFACE FOR A PHOTONICS DATABASE", filed Aug. 16, 2021, each of which is incorporated herein by reference as if set forth in full.

BACKGROUND

Field of the Invention

The embodiments described herein are generally directed to data extraction, processing, and standardization, and, more particularly, to extracting, processing and standardizing information for products in the photonics space.

Description of the Related Art

Data and information for photonics products is spread out over the internet and not highly standardized, which makes it difficult to quickly find and compare products. There is no existing search engine or webpage that enables searching, filtering, comparing and ordering of photonics products.

SUMMARY

Accordingly, systems, methods, and non-transitory computer-readable media are disclosed to extracting, processing and standardizing information for products in the photonics space.

According to one aspect, a system comprising: at least one hardware processor; and one or more software modules that are configured to, when executed by the at least one hardware processor, access product information for a plurality of products from a plurality of external systems; extract product data from the accessed product information; process text and table information to extract further product data from the accessed product information; standardized the extracted product data; store the standardized product data; store the standardized product data in a database; and present a user interface to user systems that presents standardized information related to the plurality of products that enables searching, filtering and comparing of the standardized information. In an embodiment, the user interface presents the standardized information related to the plurality of products in table form and filters that can be used to filter the standardized information in the table, wherein the table and the filters can be adapted to the user's preferences, and wherein the user interface allows the user to group products from a particular supplier and generate a quotation that gives the details of each product and the price.

The method and systems may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 is a screen shot illustrating a user interface that provides a search function in accordance with on example embodiment;

FIG. 7 is a screen shot illustrating a comparison capability offered by the user interface of FIG. 4 in accordance with one embodiment.

DETAILED DESCRIPTION

In an embodiment, systems, methods, and non-transitory computer-readable media are disclosed for easy access to information about products and services in the field of photonics. This allows users to quickly find a product that suits their needs and buy it directly from a supplier. While the embodiments described are directed specifically to photonics, it will be apparent that the embodiments are not necessarily limited to photonics. After reading this description, it will become apparent to one skilled in the art how to implement various alternative embodiments and alternative applications. However, although various embodiments will be described herein, it is understood that these embodiments are presented by way of example and illustration only, and not limitation. As such, this detailed description of various embodiments should not be construed to limit the scope or breadth of the appended claims.

Figure 1:
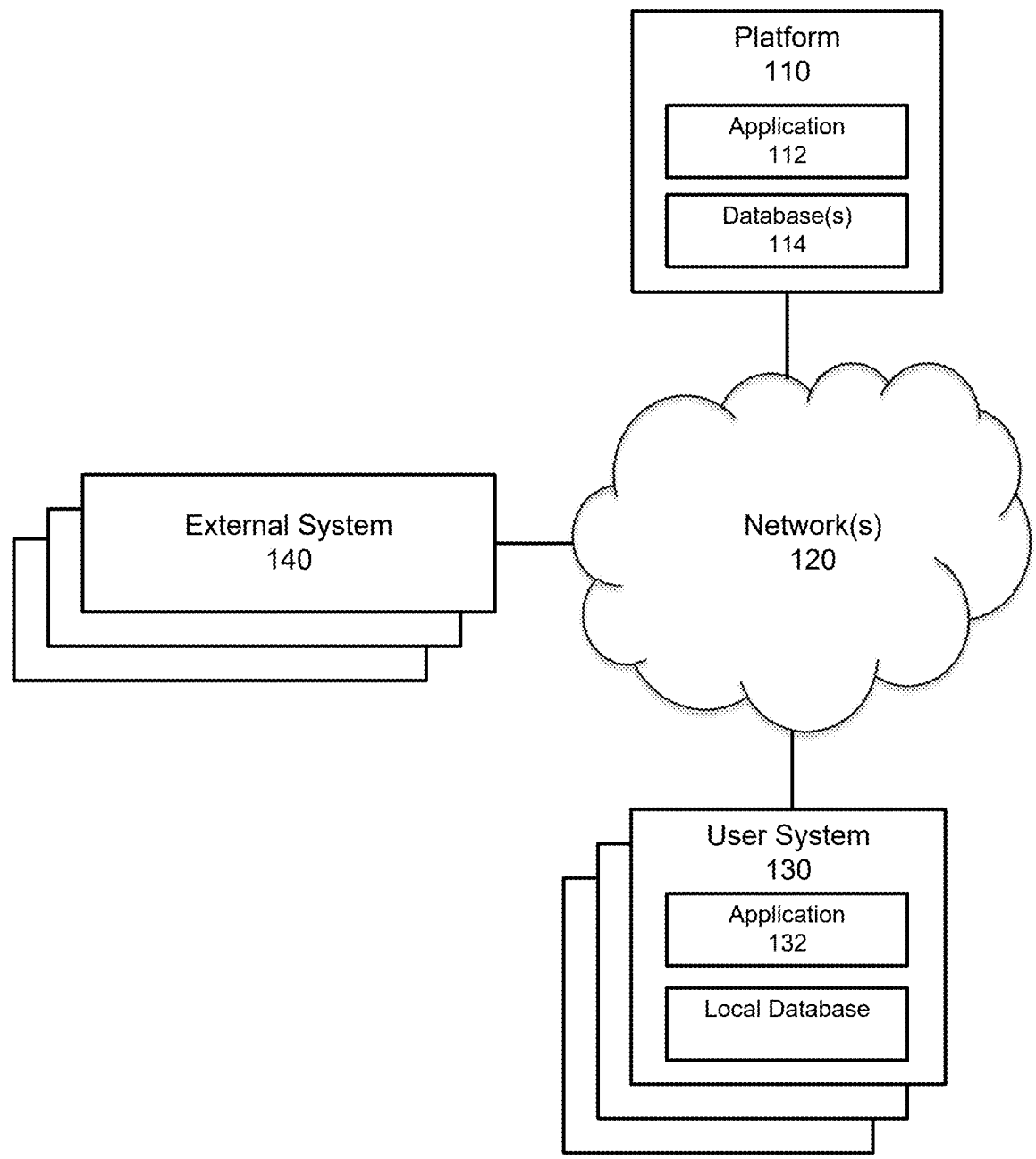
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Access™, MongoDB, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

Figure 2:
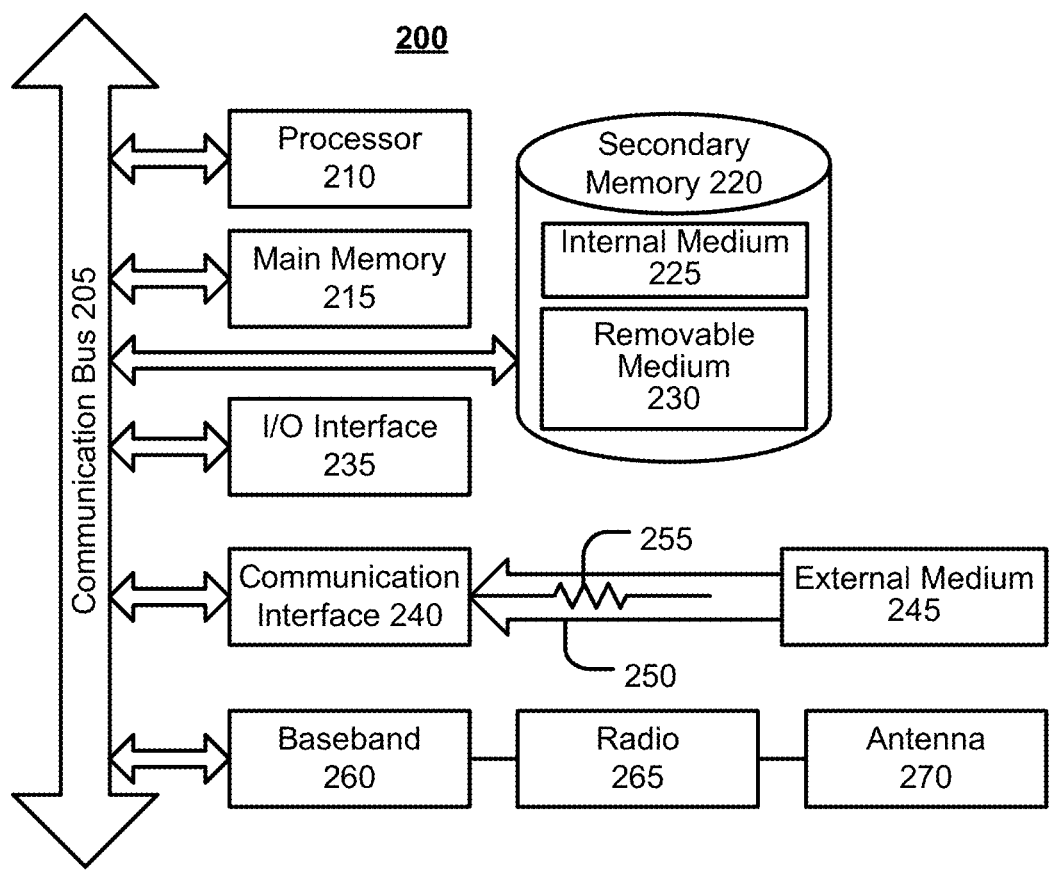
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

Embodiments of processes for data extraction, processing, and standardization of data related to photonic products in order to build a database and search engine that allows searching, filtering, comparing and purchasing of photonics products will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 3:
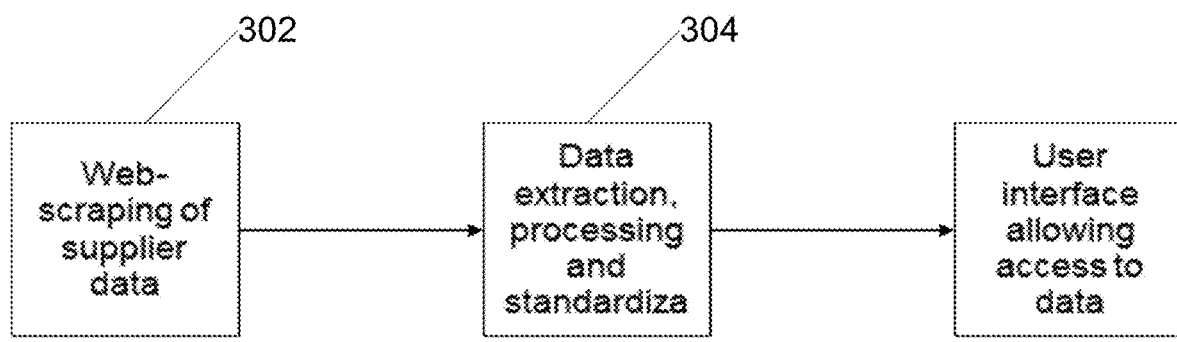
FIG. 3 is a flow chart illustrating a process of acquiring data from external, according to an embodiment.

In certain embodiments, platform 110 can be configured to interface with a plurality of supplier systems 140 and develop a database 114 of information related to the products provided by suppliers associated with systems 140. As illustrated in FIG. 3, application 112 can be configured to access supplier data from supplier systems 140 in step 302. For example, application 112 can be configured to scrape the product data on supplier systems 140. AS illustrated in step 304, application 112 can then extract certain types of data, process the extracted data and standardize for storage in database 114. Application 112 in conjunction with front end application 132 can then provide users with a user interface that allows the users to view, search, filter, and compare products based on the standardized information in database 114.

Thus, platform 110 provides users easy access to information about products and services, e.g., in the field of photonics. This allows users to quickly find a product that suits their needs and buy it directly from a supplier. Platform 110 can also be configured to provide suppliers access to highly qualified leads, i.e., potential customers that have found products by searching for very specific criteria and have a high chance of buying a product. For users, platform 110 makes this possible through a user interface that allows the user to search, sort and filter by any criteria. For the suppliers, platform 110 allows them to list their products with minimal input from the supplier by using web scraping to extract data about the products from the supplier system/website 140.

To allow suppliers to list their products on platform 110, application 112 implements a web-scraper that goes to the suppliers' website 140. The scraper visits the pages (step 302) of each product listed by the supplier and saves the information in a database 114. The scraper can visit hundreds of thousands of product pages in a single day, allowing the scraper to not only save information about the individual products, but also visit the product pages every day to save information about how the product price and availability changes on a daily basis. Tracking this information over time allows platform 110 to understand how the market is evolving.

From the data scraped from the suppliers' websites, data is then extracted about the products of the supplier in step 304. This can involve, depending on the embodiment, using the html structure of the suppliers' webpage to identify important information such as the product title, product price and availability, an image of the product, the product description, the categorization of the product within the supplier's website, tables of specifications and technical documents such as pdf, graphs and optical design tool documents associated with the product.

Any tables of product specifications are then processed to extract the specifications of the product. The includes extraction of data from simple tables such as:

But also, more complicated data tables as:

| Coating Specifications | |
| --- | --- |
| Coating Designation | Reflectance (click for graph) |
| E01 | $R_{avg} > 99\%$ (350-400 nm) |
| E02 | $R_{avg} > 99\%$ (400-750 nm) |
| E03 | $R_{avg} > 99\%$ (750-110 nm) |
| E04 | $R_{avg} > 99\%$ (1280-1600 nm) |

| Coating Designation | Damage Threshold | |
| --- | --- | --- |
| E01 | Pulse | 1 J/cm$^2$ (355 nm, 10 ns, 10 Hz, ø 0.373 mm) |
| E02 | Pulse | 0.25 J/cm$^2$ (532 nm, 10 ns, 10 Hz, ø 0.803 mm) |
|  | cw[a, b] | 550 W/cm (532 nm, ø 1.000 mm) |
| E03 | Pulse | 0.205 J/cm$^2$ (800 nm, 99 fs, 1 kHz, ø 0.166 mm) |
|  |  | 1 J/cm$^2$ (810 nm, 10 ns, 10 Hz, ø 0.133 mm) |
|  |  | 0.5 J/cm$^2$ (1064 nm, 10 ns, 10 Hz, ø 0.433 mm) |
|  | cw[a, b] | 10 kW/cm (1070 nm, ø 0.971 mm) |
| E04 | Pulse | 2.5 J/cm$^2$ (1542 nm, 10 ns, 10 Hz, ø 0.181 mm) |
|  | cw[a, b] | 350 W/cm (1540 nm, ø 1.030 mm) |

Text associated with the product is also processed in step 304 using natural language processing and other contextual text processing techniques to extract specifications that may only be mentioned in the text and not in a table. For example, the text processor takes strings such as "N-BK7 Plano-Convex Lens, Ø2.0 mm, f=4 mm, AR Coating: 350-700 nm" and extracts that the product is a Plano-Covex Lens with Diameter: 2 mm, Focal Length: 4 mm, Substrate Material: N-BK7 and has Coating: Anti-reflection from 350-700 nm. This text processing has been specially designed to understand scientific notation of specifications.

The specifications extracted are typically key, value pairs such as Focal Length: 4 mm, where the value typically has a unit of measurement associated with it. Some specifications have more complicated sets of data associated with them, for example a mirror might have reflectance described by "R_avg>94% @ 700-800 nm, R_avg>97% @ 800-2000 nm, R_avg>98% @ 2-12 um", where multiple reflectances are given for different wavelength ranges. In this case the reflectance value only applies within the stated wavelength range and the association of the reflectance value with the range of wavelengths is retained from the data to allow this information to be used in the search.

Once product specifications have been extracted from the supplier data, the data are standardized in step 304 by converting the names of the specifications to a standard naming set and converting the units of each specification to a standard unit.

In certain embodiments, metadata about the products are created, including an automatic categorization of the product, which considers the original categorization of the product in the supplier's website along with the specification of the product and information extracted from the products description. Metadata tags and descriptions are also created to facilitate product search.

| Item #[a] | Diameter (mm) | Focal Length (mm) | Dipter[b] | Radius of Curvature (mm) | Center Thickness (mm) | Edge Thickness (mm) | Back Focal Length (mm) | Reference Drawing |
| --- | --- | --- | --- | --- | --- | --- | --- | --- |
| LA1024-A | 2.0 | 4.0 | +250.0 | 2.1 | 1.0 | 0.7 | 3.34 | (i) |
| LA1026-A | 2.0 | 6.0 | +166.7 | 3.1 | 1.0 | 0.8 | 5.34 | |

The user interface leverages the previous preparation of the product data to allow users to search, filter and sort products by complicated criteria. The initial interface for browsing a particular category of products shows a table of products, with the most important specifications shown as table columns as illustrated in the screen shot of FIG. 4. For example, for "Spherical Lenses" the "Focal Length" and "Diameter" as shown in the screen shot of FIG. 4 can be most important. Filters for these important specifications are also shown on the left of the table in the screen shot of FIG. 4, so that users can only show search results fitting the values they need for a particular specification. This table and the filters can then be adapted to the user's preferences, where the user can choose which specifications are shown as columns in the table and use additional filters from a list. In this way the user can completely customize the data table and the filters they use.

The data table also adjusts automatically when the user begins to use a filter. For example, if the user adds the "Surface Quality" filter and selects a value, then a column displaying the surface quality of each product is automatically added to the data table.

The data tables and filters also adjust automatically if the user enters a search term in the search box. For example, if the user searches for "ball lens" then the table will automatically show the data columns that are most important for this search term, and at the same time the filters that are most important. Importance is decided initially by the number of products in the search results that have a particular specification, and over time will be weighted by how often users in general use a particular filter or column for sorting and how often the current user has used them. In this way the table will learn the preferences of the users and become adapted to them.

Figure 5:
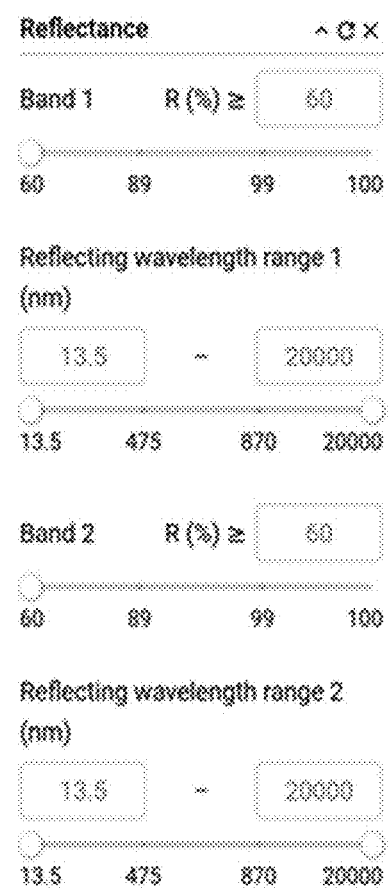
FIG. 5 is a screen shot illustrating a filtering capability associated with a user interface in accordance with one embodiment.

The user interface can also present search filters that are highly adapted to the specifications. For example the filter for reflectance as illustrated in the screen shot of FIG. 5. This allow users to search for products that match reflectance values for certain wavelength ranges such as the product discussed in the data processing section with reflectance "R_avg>94% @ 700-800 nm, R_avg>97% @ 800-2000 nm, R_avg>98% @ 2-12 um".

Figure 6:
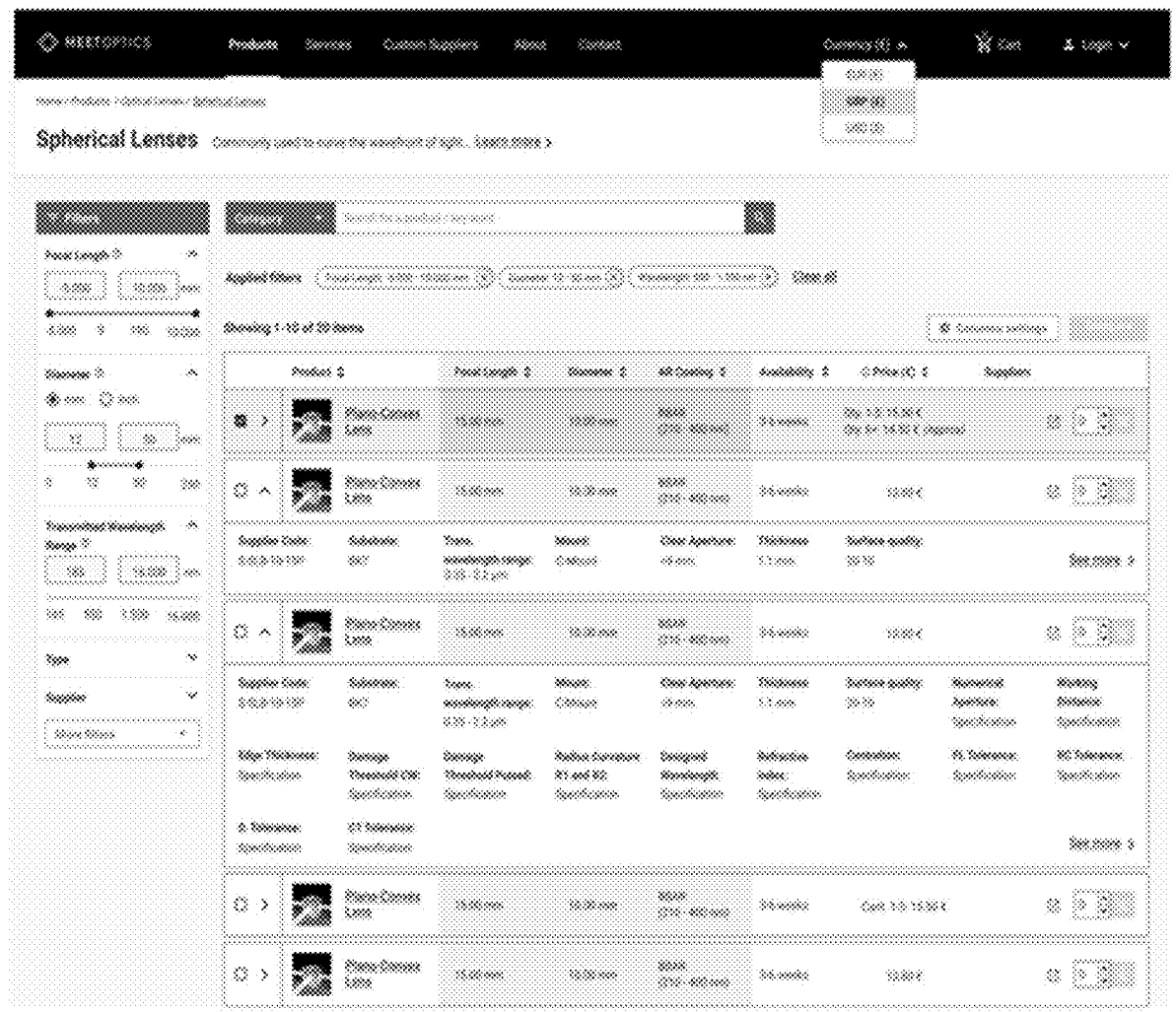
FIG. 6 is a screen shot illustrating an expanded search function associated with the user interface of FIG. 4 in accordance with one embodiment.

Aside from seeing specifications in the data table columns, each product in the table is also expandable to show more details about the product as illustrated in the screen shot of FIG. 6.

The user can then select products they are interested in to compare in a separate comparison table, which shows all the specifications of the products and compare them as illustrated in the screen shot of FIG. 7. The comparison table can automatically show the most important properties of the products first in a similar way to the data columns and filters in the search table of FIG. 4, and this can adapt over time in the same way to user preferences. Although not shown above, the comparison table will also highlight the product that has the best specification for each specification row in the table.

Figure 4:
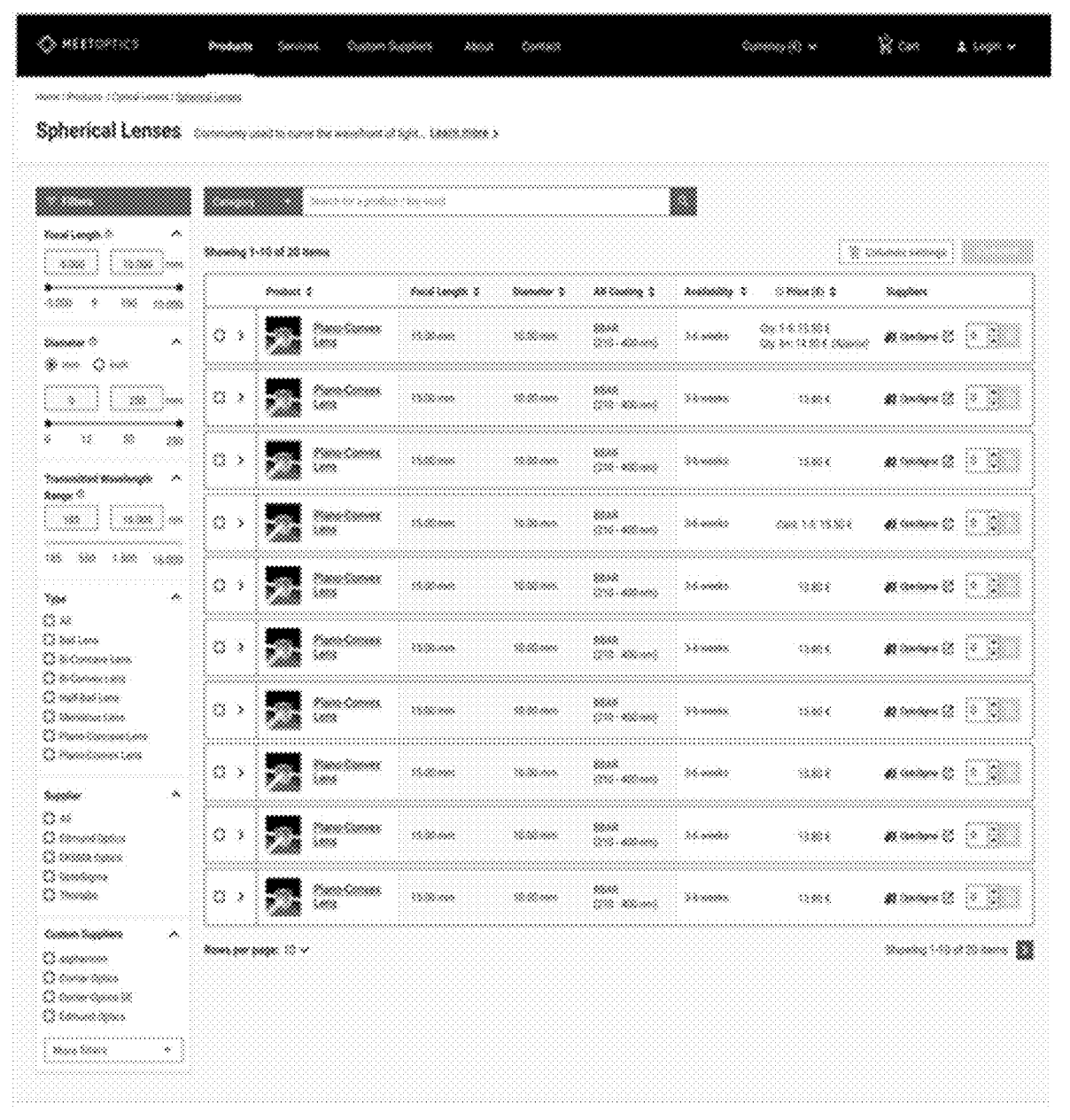

From either the comparison table of FIG. 7 or the search table of FIG. 4, the user can select products that they would like to buy by adding them to a shopping cart. In the shopping cart itself the products are then grouped by supplier with the option to buy directly from the supplier or through platform 110. If the option to buy directly from the supplier is chosen the products from that supplier can be added directly to the shopping cart on the supplier's website in a new window.

For each group of products from a particular supplier, the user can also have the option to generate a quotation that gives the details of each product and the price. Along with the quotation, the user can also generate "Alternative Quotations" that give a quotation for a similar set of products from a different supplier. The similar set of products is found using a machine learning algorithm that for each product finds the products with the most similar specifications from the alternative suppliers. To find the most similar products, the specifications are again weighted for importance in a similar way as discussed previously where over time user preferences will determine the weightings.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system comprising:
   at least one hardware processor; and
   one or more software modules that are configured to, when executed by the at least one hardware processor:
   access product information for a plurality of products from a plurality of external systems;
   extract product data from the product information;
   process text and table information to extract further product data from the product information;
   standardize the further product data into standardized product data;
   store the standardized product data;
   present a user interface to user systems that presents the standardized product data related to the plurality of products that enables searching, filtering, and comparing of the standardized product data, wherein the standardized product data is presented in table form and wherein the user interface includes filters that can be used to filter the standardized product data in the table, and wherein columns included in the table are weighted by how often users of the system specify a particular filter or a particular column for sorting and how often a current user has used the particular filter or the particular column in order to change the columns included in the table;

enable the current user via the user interface to configure the table and the filters; and adjust the standardized product data automatically in response to the current user entering a search term in a search box;

wherein the adjusted standardized product data comprises search results; and wherein a number of columns included in the table are initially determined by a number of products in the search results that have a particular specification.

2. The system of claim 1, wherein the user interface enables the current user to select which specifications are shown as the columns included in the table and use additional filters from a list of filters.

3. The system of claim 1, wherein the one or more software modules are further configured to, when executed by the at least one hardware processor: adjust the standardized product data automatically in response to the current user using the particular filter.

4. The system of claim 1, wherein the user interface further enables the current user to group products from a particular supplier and generate a quotation that gives details of each product grouped from the particular supplier.

5. The system of claim 4, wherein the details comprise at least a price.

6. The system of claim 4, wherein the user interface enables the current user to generate quotations for products grouped from the particular supplier.

7. The system of claim 4, wherein the user interface further enables the current user to generate alternative quotations that give a quotation for a similar set of products from a different supplier, wherein the similar set of products is found using a machine learning algorithm that, for each product grouped from the particular supplier, finds products with similar specifications from the alternative suppliers.

8. The system of claim 7, wherein the user interface enables the current user to configure the filters and the table based on the alternative quotations and purchases of the current user.

9. The system of claim 4, wherein the user interface enables the current user to select which specifications are shown as the columns included in the table and use additional filters from a list of filters.

10. The system of claim 4, wherein the standardized product data in the table adjusts automatically when the current user begins to use the particular filter.

11. The system of claim 4, wherein the standardized product data in the table adjusts automatically when the current user enters the search term in the search box.

12. The system of claim 1, wherein the product information is extracted via web scraping.

13. The system of claim 1, wherein extracting product information comprises using an html structure of a suppliers' webpage to identify important information of a product of the plurality of product.

14. The system of claim 13, wherein the important information comprises one or more of: product title, product price, product availability, an image of the product, product description, a categorization of the product within the supplier's webpage, and tables of specifications and technical documents associated with the product.

15. The system of claim 1, wherein accessing the product information further comprises extracting text associated with a product of the plurality of products and processing the text using natural language processing and other contextual text processing techniques to extract specifications that are only mentioned in the text and not in a table associated with the product of the plurality of products.

* * * * *